United States Patent
Grant et al.

(10) Patent No.: US 10,833,744 B2
(45) Date of Patent: Nov. 10, 2020

(54) NETWORK INITIATED RESELECTION OF TRANSMITTER AND RECEIVER CONFIGURATIONS

(71) Applicant: Telefonaktiebolaget LM Ericsson (publ), Stockholm (SE)

(72) Inventors: Stephen Grant, Pleasanton, CA (US); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/491,605

(22) PCT Filed: Feb. 20, 2018

(86) PCT No.: PCT/EP2018/054125
§ 371 (c)(1),
(2) Date: Sep. 6, 2019

(87) PCT Pub. No.: WO2018/172001
PCT Pub. Date: Sep. 27, 2018

(65) Prior Publication Data
US 2020/0059281 A1 Feb. 20, 2020

Related U.S. Application Data

(60) Provisional application No. 62/476,671, filed on Mar. 24, 2017.

(51) Int. Cl.
*H04K 1/10* (2006.01)
*H04L 27/28* (2006.01)
(Continued)

(52) U.S. Cl.
CPC ........... *H04B 7/0617* (2013.01); *H04B 7/088* (2013.01)

(58) Field of Classification Search
CPC .... H04B 7/0617; H04B 7/088; H04W 72/042
(Continued)

(56) References Cited

U.S. PATENT DOCUMENTS

| 2013/0286960 A1* | 10/2013 | Li ..................... H04W 72/042 370/329 |
| 2016/0119947 A1 | 4/2016 | Park et al. |
| 2016/0337056 A1 | 11/2016 | Frenne et al. |

FOREIGN PATENT DOCUMENTS

| WO | 2014020580 A1 | 2/2014 |
| WO | 2014112938 A1 | 7/2014 |

(Continued)

OTHER PUBLICATIONS

Ericsson, "On QCL for DL RS", 3GPP TSG-RAN WG1 #88bis, Spokane, USA, Apr. 3, 2017, pp. 1-4, R1-1705909, 3GPP.
(Continued)

*Primary Examiner* — Phuong Phu
(74) *Attorney, Agent, or Firm* — Coats & Bennett, PLLC (57) ABSTRACT

A network initiated procedure is introduced for updating an SS-BPL once the gNB TX beam and wireless device RX beam start to become misaligned due to movement/rotation of the wireless device. When the gNB measures and determines that a re-establishment of the SS-BPL should be performed, the gNB transmits a trigger signal to the wireless device to update the SS-BPL. In one embodiment, the trigger signal may initiate a new SS block measurement by the wireless device, and a transmission of an uplink signal (e.g., a PRACH transmission) to indicate to the gNB the new preferred SS block and thus a new SS-BPL. In another embodiment, the gNB determines a new SS block for the wireless device and indicates directly in a message from gNB to wireless device an SS block selected by the gNB to use for SS-BPL in subsequent transmissions.

15 Claims, 7 Drawing Sheets

(51) Int. Cl.
*H04B 7/06* (2006.01)
*H04B 7/08* (2006.01)

(58) Field of Classification Search
USPC .............. 375/260, 346, 295, 316, 219, 220; 370/329
See application file for complete search history.

(56) References Cited

FOREIGN PATENT DOCUMENTS

| WO | 2014209015 A1 | 12/2014 |
|---|---|---|
| WO | 2018172994 A1 | 9/2018 |
| WO | 2018174803 A1 | 9/2018 |

OTHER PUBLICATIONS

Intel et al., "WF on the QCL for NR", 3GPP TSG RAN WG1 Meeting #86bis, Lisbon, Portugal, Oct. 10, 2016, pp. 1-2, R1-1610520, 3GPP.

ZTE Corporation et al., "Way Forward on QCL fro NR", 3GPP TSG RAN WG1 Meeting #86-BIS, Lisbon, Portugal, Oct. 10, 2016, pp. 1-2, R1-1610513, 3GPP.

Ericsson, "Introducing Port Coherency Regions", 3GPP TSG-RAN WG1 #87ah-NR, Spokane, USA, Jan. 16, 2017, pp. 1-3, R1-1700852, 3GPP.

Nokia et al., "On QCL Framework and Configurations in NR", 3GPP TSG RAN WG1 NR Meeting, Athens, Greece, Feb. 13, 2017, pp. 1-3, R1-1703184, 3GPP.

Ericsson, "NR Four-Step Random Access Procedure", 3GPP TSG-RAN WG1 Meeting #88bis, Spokane, USA, Apr. 3, 2017, pp. 1-7, R1-1706015, 3GPP.

Ericsson, "On QCL for UL RS", 3GPP TSG-RAN WG1 #88bis, Spokane, USA, Apr. 3, 2017, pp. 1-3, R1-1705910, 3GPP.

Ericsson, "Introducing Port Coherency Regions", 3GPP TSG-RAN WG1 #88bis, Spokane, USA, Apr. 3, 2017, pp. 1-3, R1-1705914, 3GPP.

Ericsson, "Beam Management Details", 3GPP TSG-RAN WG1 #88bis, Spokane, USA, Apr. 3, 2017, pp. 1-5, R1-1705891, 3GPP.

Ericsson, "Beam Management Overview", 3GPP TSG-RAN WG1 #88, Athens, Greece, Feb. 13, 2017, pp. 1-6, R1-1702674, 3GPP.

Ericsson, "On Group-Based Reporting of Tx Beams", 3GPP TSG-RAN WG1 #88, Athens, Greece, Feb. 13, 2017, pp. 1-5, R1-1702675, 3GPP.

LG Electronics, "Discussion on QCL for NR", 3GPP TSG RAN WG1 NR Ad-Hoc Meeting, Spokane, USA, Jan. 16, 2017, pp. 1-3, R1-1700487, 3GPP.

Huawei et al., "QCL Indication of Downlink Control Channel and Beam Management Reference Signals", 3GPP TSG RAN WG1 NR Ad Hoc Meeting, Spokane, USA, Jan. 16, 2017, pp. 1-4, R1-1700405, 3GPP.

Ericsson, "On QCL for UL RS", 3GPP TSG-RAN WG1 #88, Athens, Greece, Feb. 13, 2017, pp. 1-3, R1-1702693, 3GPP.

ZTE et al., "QCL/QCB Design for UL MIMO", 3GPP TSG RAN WG1 Meeting #88, Athens, Greece, Feb. 13, 2017, pp. 1-6, R1-1701820, 3GPP.

ZTE et al., "UL Beam Management", 3GPP TSG RAN WG1 Meeting #88, Athens, Greece, Feb. 13, 2017, pp. 1-3, R1-1701804, 3GPP.

Ericsson, "Discussion on QCL", 3GPP TSG-RAN WG1 #86bis, Lisbon, Portugal, Oct. 10, 2016, pp. 1-6, R1-1609766, 3GPP.

NTT Docomo, Inc., "Views on Beam Management Framework", 3GPP TSG RAN WG1 Meeting #88, Athens, Greece, Feb. 13, 2017, pp. 1-5, R1-1702798, 3GPP.

\* cited by examiner

NETWORK INITIATED RESELECTION OF TRANSMITTER AND RECEIVER CONFIGURATIONS

TECHNICAL FIELD

The present disclosure relates generally to wireless communication networks and, more particularly, to selection/reselection of transmitter and receiver configurations based on spatial quasi co-location assumptions.

BACKGROUND

In 5th Generation (5G) or Next Radio (NR) systems being developed by the Third Generation Partnership Project (3GPP), spatial quasi co-location (QCL) has been introduced as a new concept. Two transmitted reference signals from a transmitter (e.g., base station) are said to be spatially quasi co-located at a receiver (e.g., user equipment (UE or wireless terminal) if the receiving spatial characteristics of the two received reference signals are the same or similar. Hence, a spatial QCL associates the two reference signals with respect to the underlying spatial characteristics. The spatial characteristics may be one or more of the primary angle of arrival (AoA), the receiving angular spread of the signal, the spatial correlation, or any other parameter or definition that captures spatial characteristics. These spatial characteristics may define a beam direction.

The term "antenna port" is sometimes used synonymously with and/or in place of the term "reference signal" to describe a transmission, especially in the context of spatial QCL. Thus, two reference signals are sometimes denoted equivalently as two different antenna ports. That is, a QCL assumption may be to associate two antenna ports instead of two reference signals: If two transmitted antenna ports from a 5G or NR NodeB (gNB) are spatially quasi co-located at the wireless device, the wireless device may take advantage of this relationship and use the same receiving (RX) beamforming weights to receive both the first and the second reference signals.

The use of spatial QCL is of particular importance when the wireless device uses analog beamforming, since the wireless device has to know where to direct the analog beam before receiving the signal. In digital beamforming, the wireless device does not need to know the direction of the received signal before receiving the signal, because the wireless device can apply various precoding weights at the baseband stage to decode the signal. Hence, it has been suggested for NR that the gNB signal to the wireless device that a certain previously transmitted Channel State Information (CSI)—Reference Signal (RS) resource or CSI-RS antenna port, respectively, is spatially quasi co-located with the Physical Downlink Channel (PDSCH) transmission and the PDSCH Demodulation Reference Signal (DMRS) transmission. With this information, the wireless device can use the same analog beam for the PDSCH reception as it used in the reception of the previous CSI-RS resource or antenna port. In other words, a spatial CQL assumption is formed between the downlink (DL) CSI-RS or CSI-RS antenna port, respectively, and the PDSCH or PDSCH DMRS transmission with respect to the underlying spatial characteristics.

The spatial QCL framework can also be extended to hold for transmission from the wireless device. In this case, the transmitted signal from the wireless device is spatially quasi co-located with a previous reception of a signal received by the wireless device. Accordingly, the underlying QCL assumption relates the DL signal received by the wireless device with an uplink (UL) signal sent from the wireless device with respect to the underlying spatial characteristics. If the wireless device makes this assumption for the transmission, it means that the wireless device is transmitting an uplink signal in an analog TX beam which is the same or similar to the RX beam previously used to receive a signal. In this case, the first RS transmitted from the gNB is referred to as being spatially quasi co-located at the wireless device with a second RS transmitted from the wireless device to the gNB. This spatial QCL assumption is useful in cases the gNB uses analog beamforming, since the gNB then knows from which direction to expect a transmission from the wireless device, and can therefore adjust its beam direction before the actual reception.

In 3GPP NR standardization, it has been provided support for a beam failure recovery mechanism to recover from a beam failure. In one example, the beam failure recovery procedure is a Layer 1/Layer 2 (L1/L2) mechanism that the wireless device initiates once it detects that it is unreachable e.g., by hypothesizing that the link quality between the wireless device and the gNB is insufficient to receive the PDCCH based on measurement of a reference signal (e.g., CSI-RS). The wireless device measures a signal strength of the CSI-RS received from the gNB and hypothesizes the PDCCH quality taking into account the required SINR to reliably detect the PDCCH.

After the wireless device detects a beam failure event, the wireless device listens to Synchronization Signal (SS) block transmissions (typically the SS blocks are transmitted in a beam swept manner) from the gNB to determine a preferred gNB TX beam. The wireless device then transmits a beam recovery signal (e.g., similar to a preamble transmitted on the Physical Random Access Channel (PRACH)) in the same (preferred) TX beam as the RX beam it used to receive the SS block. The beam recovery signal informs the network that a beam failure has occurred.

As described above, during the PRACH or beam recovery procedures, the gNB and the wireless device together establish a first beam pair link denoted herein as the SS-BPL. For receiving or transmitting signals using this BPL, the wireless device assumes spatial QCL associations with the previously preferred and detected SS block.

A problem with beam failure recovery procedure described above, is that it is only initiated once the wireless device becomes unreachable. Another drawback is that the recovery procedure is wireless device initiated, and hence not predictable by the network. Because the wireless device uses potentially the same PRACH resources as wireless devices making initial system access attempts, the beam failure recovery mechanism needs to contend with other wireless devices attempting initial access, which could become a problem in high load scenarios and cause degradation of the accessibility key performance indicator (KPI). Another problem is how to re-establish a new SS-BPL after the beam failure recovery procedure.

SUMMARY

It is an object of the present invention to solve at least one of the problems in the prior art. This object is achieved by the independent claims. Advantageous embodiments are described in the dependent claims.

According to one aspect, a method implemented by a network node in a wireless communication network is provided. The method comprising selecting, based on a spatial quasi co-location (QCL) assumption, an initial transmitter configuration for transmitting downlink data signals to the wireless device. The method further comprising determining a quality of an uplink signal received from the wireless device, and based on the quality of the uplink signal, initiating a reselection procedure to select a new transmitter configuration for transmitting the downlink data signals in accordance with the spatial QCL assumption.

According to another aspect, a network node in a wireless communication network is provided. The network node comprises interface circuit for transmitting signals to and receiving signals from a wireless device served by the network node and a processing circuit configured to select, based on a spatial quasi co-location (QCL) assumption, an initial transmitter configuration for transmitting downlink data signals to the wireless device. The processing circuit is further configured to determine a quality of an uplink signal received from the wireless device, and based on the quality of the uplink signal, initiate a reselection procedure to select a new transmitter configuration for transmitting the downlink data signals in accordance with the spatial QCL assumption.

According to another aspect, a method implemented by a wireless device in a wireless communication network is provided. The method comprises the step of selecting, based on a spatial quasi co-location (QCL) assumption, an initial receiver configuration for receiving downlink data signals from a network node. The method further comprises the steps of receiving a trigger signal from the network node, and responsive to the trigger signal, executing a reselection procedure to select a new receiver configuration for receiving the downlink data signals.

According to another aspect, a wireless device in a wireless communication network is provided. The wireless device comprises an interface circuit for transmitting signals to and receiving signals from a network node and a processing circuit configured to select, based on a spatial quasi co-location (QCL) assumption, an initial receiver configuration for receiving downlink data signals from a network node. The processing circuit is further configured to receive a trigger signal from the network node, and responsive to the trigger signal, execute a reselection procedure to select a new receiver configuration for receiving the downlink data signals.

According to another aspect, a wireless device in a wireless communication network is provided. The wireless device is configured to select, based on a spatial quasi co-location (QCL) assumption, an initial receiver configuration for receiving downlink data signals from a network node. The wireless device is further configured to receive a trigger signal from the network node, and responsive to the trigger signal, execute a reselection procedure to update the receiver configuration for receiving the downlink data signals.

The present invention also concerns computer programs comprising portions of software codes or instructions in order to implement the methods as described above when operated by a processing circuit in a network node of a wireless communication network or in a wireless device. The computer programs can be stored on non-transitory computer-readable mediums. The present invention also concerns carriers which contain said computer programs, wherein the carriers are one of an electronic signal, optical signal, radio signal, or computer readable storage medium.

BRIEF DESCRIPTION OF THE FIGURES

In the following, the invention will further be described with reference to exemplary embodiments illustrated in the figures, in which.

DETAILED DESCRIPTION

In one aspect of the disclosure, a network initiated procedure is introduced for updating the SS-BPL once the gNB TX beam and wireless device RX beam start to become misaligned due to movement/rotation of the wireless device. After initial access, an SS-BPL is established, the gNB selects a transmitter configuration for transmitting data signals (e.g., PDCCH and/or PDSCH signals), and the wireless device selects a corresponding receiver configuration to receive the data signals. The transmitter and receiver configurations determine the spatial direction of the transmit and receive beams respectively, and are aligned because the gNB and wireless device select their respective configurations based on the same spatial QCL assumptions. When the gNB measures and determines that a re-establishment of the SS-BPL should be performed, the gNB transmits a trigger signal to the wireless device to update the SS-BPL. In one embodiment, the trigger signal may initiate a new SS block measurement by the wireless device, and a transmission of an uplink signal (e.g., a PRACH transmission) to indicate to the gNB the new preferred SS block and thus a new SS-BPL. In another embodiment, the gNB determines a new SS block for the wireless device and indicates directly in a message from gNB to wireless device an SS block selected by the gNB to use for SS-BPL in subsequent transmissions.

The wireless device may assume that the SS block associated with the SS-BPL is spatially QCL on the wireless device side with subsequent receptions of signals, such as PDCCH transmissions and PDCCH Demodulation Reference Signals (DMRS). The wireless device should transmit subsequent signals, such as Physical Uplink Control Channel (PUCCH), Physical Uplink Shared Channel (PUSCH) and associated DMRS, so that these transmitted signals are spatially QCL with the SS block.

The reselection procedure can be either wireless device-assisted and gNB controlled, or completely gNB controlled. In the wireless device-assisted and gNB controlled solution, the gNB triggers similar actions by the wireless device as the beam failure recovery mechanism. In the gNB controlled solution without wireless device assistance, the gNB directly and explicitly indicates to the wireless device which SS block it should use as the SS-BPL. The re-establishment procedure is initiated by the network, preferably before beam link failure occurs.

The SS-BPL reselection procedure offers the following benefits/advantages:
- The SS-BPL, which is used at least for transmission of common or group common PDCCH, is always usable, so the wireless device is always reachable even as it moves/rotates. Rather than waiting for the link to fail, the gNB can take pre-emptive action to keep the SS-BPL in alignment. This ensures more robust system performance, and improves latency.
- The reselection procedure is network controlled so that the reselection command can be scheduled at an appropriate time, providing the network the ability to smooth out PRACH load across the configured PRACH occasions.
- Having a network controlled procedure allows more predictability in radio resource usage than a wireless device initiated procedure.

Referring now to the drawings, an exemplary embodiment of the disclosure will be described in the context of a Third Generation Partnership Project (3GPP) Next Radio (NR) wireless communication network. Those skilled in the art will appreciate that the methods and apparatus herein described are not limited to use in NR networks, but may also be used in wireless communication networks operating according to 5G standards and other standards where spatial QCL assumptions are used.

Figure 1:
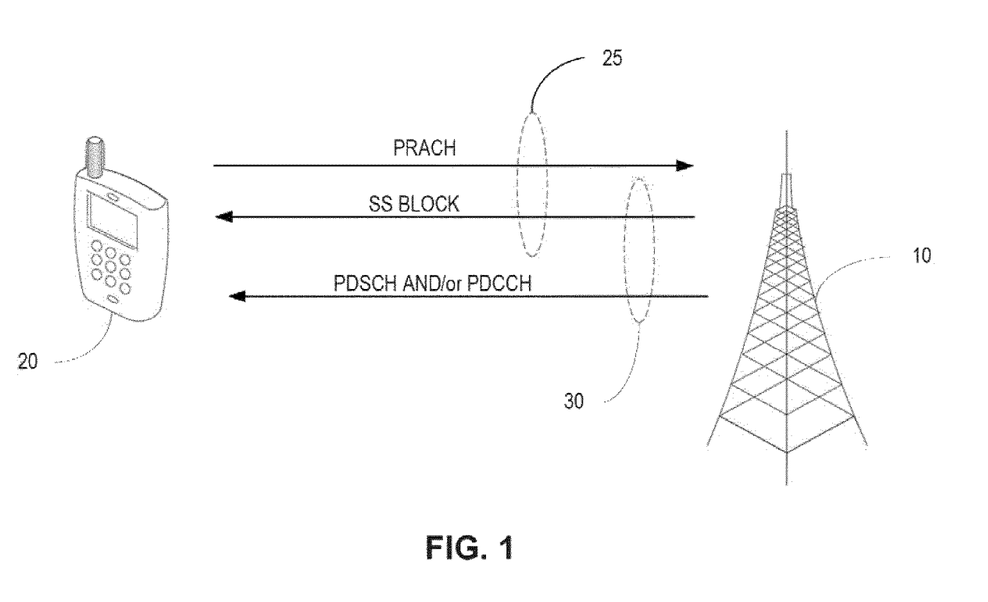
FIG. 1 illustrates beam pair links used for communication between a gNB and a wireless device.

FIG. 1 illustrates communications between a gNB 10 and a wireless device 20 in a NR network. The gNB 10 transmits a SS block on the downlink to the wireless device 20. The wireless device 20 transmits PRACH signals on the uplink that are associated with the SS block by a spatial QCL assumption to form a first BPL 25. In one embodiment, the wireless device 20 detects a preferred SS block from among two or more different SS blocks and transmits the PRACH signals to the gNB 10 on the same beam, used to receive the preferred SS block. After receiving the PRACH signal from the wireless device, the gNB 10 knows the preferred SS block and the beam on which the preferred SS block was transmitted. The gNB 10 thereafter transmits downlink data signals on PSCCH or PDSCH that is associated by a second spatial QCL assumption to form a second BPL 30. The gNB 10 and the wireless device 20 apply the same spatial QCL assumptions. Therefore, the wireless device 20 expects that the downlink data signals (e.g., user data or control signals) to be transmitted on the same beam, or in the same beam direction, used to transmit the PRACH signals.

In one embodiment, the SS block comprises a first reference signal (RS). The SS block may be used the wireless device 20 for purposes such as initial access, recovery from a beam link failure (e.g., blockage of currently used beam pair link), and for idle mode mobility between cells. In one embodiment, the SS block comprises the primary synchronization signal (PSS), secondary synchronization signal (SSS), Physical Broadcast Channel (PBCH) and possibly a tertiary synchronization signal (TSS). The SS block in one embodiment spans 4 Orthogonal Frequency Division Multiplexing (OFDM) symbols, however the SS block could span a larger number or lesser number of OFDM symbols.

Multiple SS blocks can be transmitted in different beamforming directions, and thus each SS block can benefit from the antenna gain of a beam. The drawback is that multiple SS block requires multiples of 4 OFDM symbols to be used to cover the whole gNB area with such beams. Narrower beams provide better coverage per beam but at the cost of larger overhead for transmitting SS blocks. Hence, there is a tradeoff between coverage and overhead. Typically, the SS block beams are wider than beams used for data transmission. The latter can be very narrow to provide very high antenna gain in order to maximize the Signal to Interference Plus Noise Ratio (SINR) at the receiver.

Referring back to FIG. 1, the wireless device 20 transmits a Physical Random Access Channel (PRACH) signal and/or a beam recovery signal (which can be a form of PRACH signal) to the gNB 10 in order for the wireless device to establish synchronization with the serving cell (e.g., initial access, idle mode mobility, etc.), or to re-establish a beam pair link (i.e., beam recovery). The PRACH signals or recovery signals may be considered a second RS. When the wireless device 20 transmits the PRACH or beam recovery signal (second RS), it should assume that the transmitted PRACH/beam recovery signal is spatially QCL at the wireless device side with the received RS belonging to a preferred and detected SS block (the 1st RS) amongst the multiple beamformed SS blocks. The wireless device 20 thus transmits the PRACH/beam recovery signal in the same beam used to receive the SS block. This relationship introduces predictability on the network side because the beam the wireless device 20 uses for transmissions is known, and the gNB 10 can use the same receive (RX) beam to receive the PRACH as the transmit (TX) beam it used to transmit the SS block. Hence, for each SS block there are associated PRACH resources. Alternatively, which PRACH resource to use can be indicated in PBCH within the preferred SS block.

In the downlink direction, the gNB 10 transmits downlink data signals to the wireless device 20. The downlink data signals may comprise data signals carrying user data or data signals carrying control information. The downlink data signals may be transmitted on a Physical Downlink Control Channel (PDCCH) or PDSCH. In one embodiments, it is assumed that the transmissions of the data signals on a PDCCH or PDSCH should be spatially co-located with the transmission of the preferred SS block. This assumed spatial co-location relationship forms a second beam pair link 30 between the SS block and data signals.

With the BPLs 25, 30 and the spatial QCL assumptions for the PRACH, PDCCH, and PDSCH, the gNB 10 and wireless device 20 can autonomously establish a coarse beam pair link (BPL) relation, without explicit signaling, that may be used until further notice for purposes such as receiving the PDCCH transmissions from the gNB 10 in the common search space or group common search space.

In one embodiment, scheduling information may be transmitted by the gNB 10 on the common search space PDCCH to schedule a Physical Downlink Control Channel (PDSCH) transmission to the wireless device 20 that contains configuration information for a wireless device 20 specific search space and for configuration of CSI-RS resources to use for CSI and/or beam management measurements. To receive the PDSCH carrying this configuration information, the wireless device 20 can assume that the DMRS associated with the PDSCH (2nd RS) is spatially QCL with the previously detected SS block (1st RS) so that it can configure its RX beam to use for reception. Hence, the wireless device 20 should tune its analog beam when receiving common search space PDCCH in the same way was it tuned the RX beam when it received the preferred SS block.

A different beam pair link (BPL) that uses different QCL assumptions may be used for reception of the PDCCH in the device-specific search space. In this case, the PDCCH in the device-specific search space may be used for the purposes of scheduling PDSCH transmission and PUSCH transmissions carrying user data.

In embodiments of the disclosure, the gNB 10 and wireless device 20 each have an established BPL under a spatial QCL assumption for an DL SS block and an UL PRACH signal. The BPL is established when the gNB 10 has received the PRACH signal. The BPL includes a beam of the gNB 10 used for DL transmission (transmit beam) and UL reception (receive beam), and a beam of the wireless device 20 used for UL transmission (transmit beam) and DL reception (receive beam). In other words, the transmit beam and the receive beam of the wireless device 20 and gNB 10, respectively, are the same or similar. In this respect, a transmit or receive beam may be associated with a particular transmitter configuration or receiver configuration used in by the wireless device 20 or gNB 10 to send or receive this beam, respectively. A transmitter configuration may be characterized by transmit beamforming weights and a receiver configuration may be characterized by receive beamforming weights. It is noted that the transmit beamforming weights define a precoder used for transmitting a signal via the beam. In contrast, processing a received signal might not use a precoder.

Figure 2:
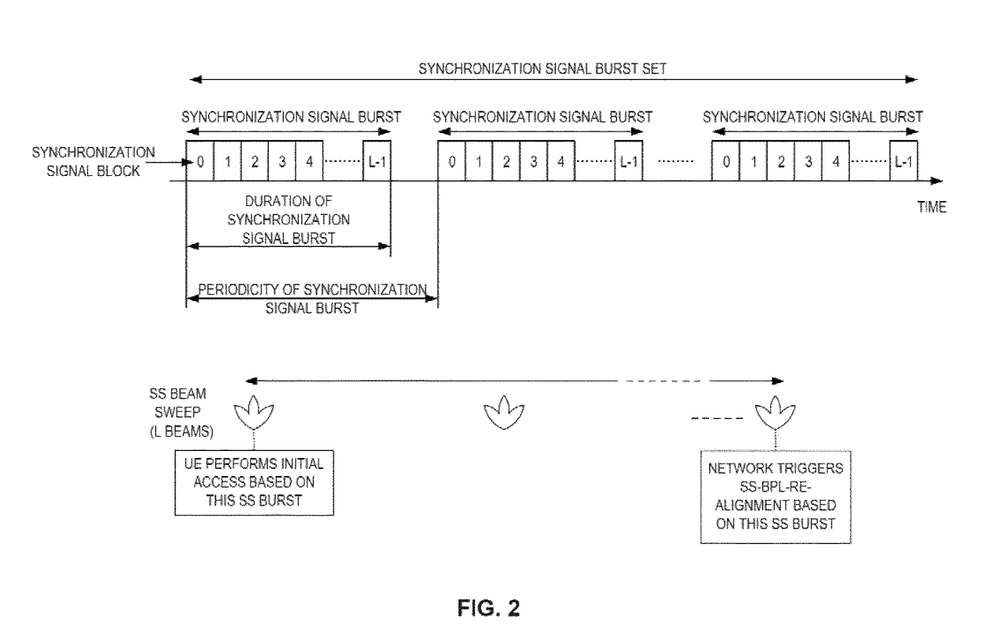
FIG. 2 illustrates a beam sweep procedure enabling the wireless device to detect a preferred SS block.

FIG. 2 illustrates one example of how the BPLs are established in one embodiment. The gNB 10 periodically transmits a series (burst) of L SS blocks, where it has been agreed in 3GPP NR that each SS block consists of PSS, SSS, PBCH, and possibly a TSS. The SS block will likely span 4 OFDM symbols, which is however, not agreed upon in 3GPP NR. Multiple SS blocks can be transmitted in different beamforming directions, and thus each SS block can benefit from the antenna gain of a beam. In other words, the gNB 10 send in time different L SS blocks using different L beams. The mapping between SS block and transmit beam is a one to one mapping. Since the gNB 10 applies the beamforming on each SS block, it has knowledge of the association between each used transmit beam and the corresponding SS block. The consequence is that multiple SS block requires multiples of 4 OFDM symbols to be used to cover the whole gNB 10 area with such beams. The narrower the beams, the better is the coverage per beam but the larger is the overhead from transmitting SS blocks. Hence, there is a tradeoff between coverage and overhead.

The wireless device 20 uses the beam swept SS block transmissions to perform initial system access, as shown on the left of FIG. 1. The wireless device 20 selects a preferred SS beam based, e.g., on measured signal strength. The wireless device 20 should assume that PRACH signal used for initial access is spatially quasi co-located with the RS belonging to the preferred and detected SS block. This means that the wireless device 20 transmits PRACH signals in the same beam as it used to receive the preferred SS block. The network can then use the same beam to receive the PRACH as it used to transmit the SS block detected by the wireless device 20. With this RACH/beam recovery procedure and associated QCL assumptions, the gNB 10 and wireless device 20 thus establish a coarse beam pair link (BPL) that may be used from now until further notice for purposes such as receiving common search space or group common search space PDCCH transmitted from gNB 10 or TRP.

Embodiments of the present disclosure are directed a beam pair link (BPL) for which the wireless device 20 assumes QCL associations with the previously preferred and detected SS block for which the wireless device 20 has transmitted an associated PRACH resource. We refer to this BPL which is established using QCL with an SS block, as the SS-BPL.

The SS block beams are static. A problem with static SS block beams is that the preferred SS block becomes outdated when the wireless device 20 moves or when there are changes in the channel. As a result, the gNB TX/RX beams and the wireless device 20 RX/TX beams that are associated with the SS-BPL may become misaligned due to wireless device 20 mobility, rotation, or channel blockage. Signal reception at the wireless device 20 can be degraded if the misalignment (i.e., pointing error) is significant. Even worse, a beam link failure can occur, in which case the network is not able to reach the wireless device 20 with PDCCH.

As the wireless device 20 moves and/or rotates, the gNB 10 TX/RX beams and the wireless device 20 RX/TX beams associated with the SS-BPL may become misaligned (pointing error). The same may happen if the channel between the wireless device 20 and gNB 10 become at least partially blocked. In these cases, signal reception at the wireless device 20 can start to degrade as the pointing error increases. In the current disclosure, this problem is solved by a network initiated procedure to reselect (re-align) the SS-BPL (updated or re-aligned BPL). The procedure can be either wireless device assisted and gNB 10 controlled, or completely gNB 10 controlled.

In the beam failure recovery procedure, the wireless device 20 transmits a PRAC-like signal in a resource that is linked to the SS-BPL. It means that the wireless device 20 will use the same TX beam for this PRACH transmission as the RX beam it used to receive the preferred SS block and the gNB 10 then knows which RX beam to use for receiving beam failure signals since each PRACH resource is linked to an SS block which is transmitted with a certain, known TX beam from the gNB 10. In contrast to the below embodiments, the triggering of the beam failure recovery is initiated by the wireless device 20.

Figure 3:
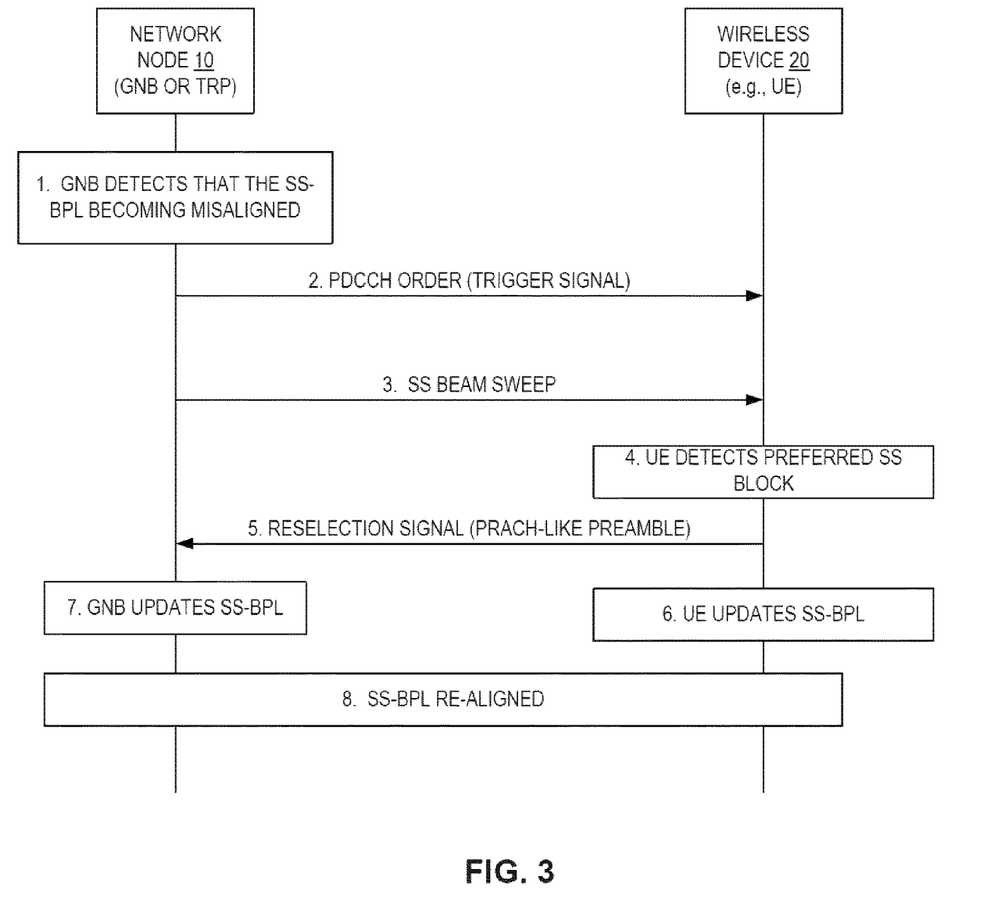
FIG. 3 illustrates a reselection procedure to re-align a beam pair link for selecting the transmitter and receiver configuration, respectively, by a network node and a wireless device.

FIG. 3 discloses a network controlled and wireless device 20 assisted embodiment. The gNB 10 detects that the BPL is becoming misaligned (step 1) and sends a trigger signal (step 2) to the wireless device 20 to triggers a reelection procedure similar to the beam failure recovery mechanism and initial access procedure. The trigger signal may be sent in a PDCCG Order or on via Radio Resource Control (RRC) signaling. During the reelection procedure, the gNB 10 transmits the SS blocks in a beam swept manner as previously described (step 3). Responsive to the trigger signal, the wireless device 20 transmits detects a preferred SS block (step 4) and transmits a reselection signal resembling a preamble on the PRACH (step 5). The PRACH or a PRACH like signal may have been configured by higher layers such as RRC signaling. In one embodiment, each PRACH resource is associated with a SS block so when receiving the PRACH resource the network knows which of the SS blocks the wireless device 20 now prefers.

In one alternative (Alt1), the wireless device 20 may continuously measure on multiple SS blocks to monitor the received power or quality and would use the preferred SS block (i.e., the SS block whose signal is received with the highest signal strength) to derive the PRACH resource to use when triggered by the gNB 10.

In a second alternative (Alt2), the wireless device 20 would initiate a series of measurement on the multiple SS blocks when receiving the trigger from the gNB 10, determine a new preferred SS block and, at a defined time, transmit the PRACH in the PRACH resource corresponding to the preferred SS block. After reselection signal is transmitted on the PRACH, the wireless device 20 and gNB 10 update the SS-BPL that is used to determine the receiver configuration and transmitter configuration respectively (blocks 6 and 7). The end result is realignment of the SS-BPL (step 8).

Whatever RX beam on which the gNB 10 detects the beam recovery signal then becomes the new gNB 10 TX/RX beam associated with the recovered SS-BPL. Likewise, the wireless device 20 remembers the beam on which it received the SS, and this becomes the new wireless device 20 RX/TX beam associated with the SS-BPL. Through this process, the SS-BPL is re-established.

Figure 4:
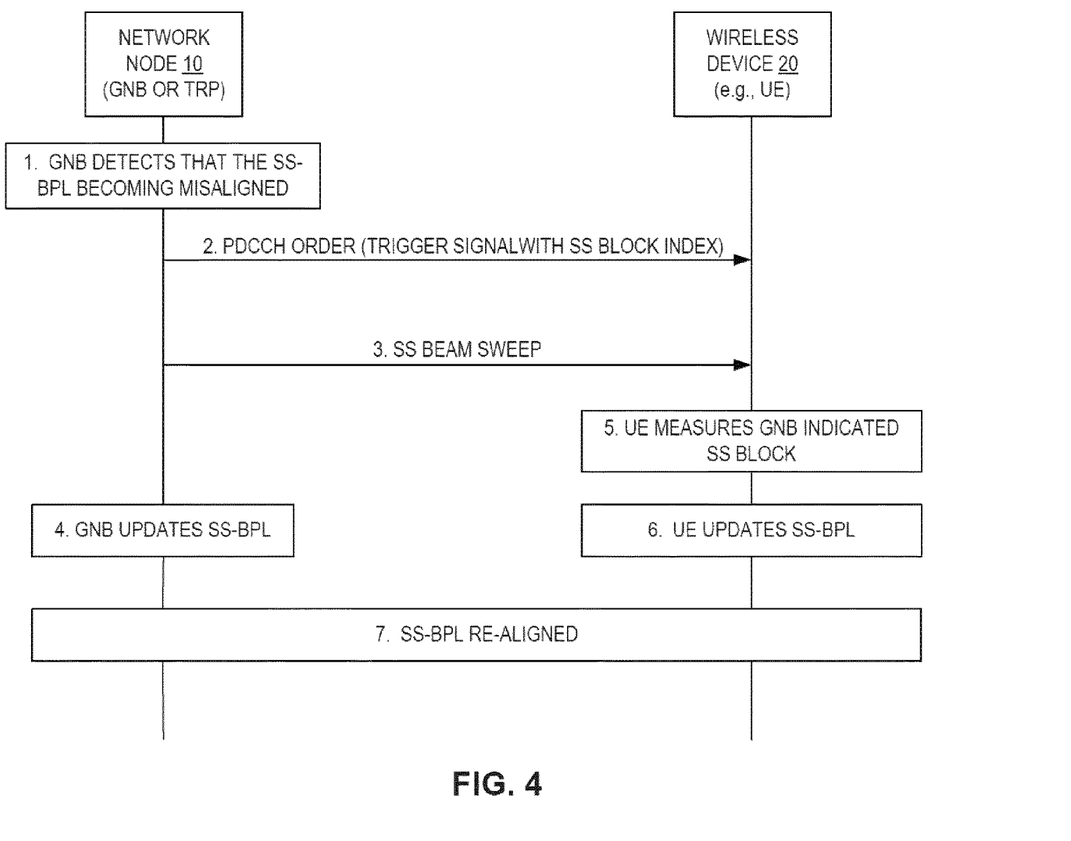
FIG. 4 illustrates another reselection procedure to re-align a beam pair link for selecting the transmitter and receiver configuration, respectively, by a network node and a wireless device.

FIG. 4 discloses a network controlled and no wireless device assistance embodiment. The gNB 10 detects that the SS-BPL is misaligned and transmits the trigger signal as previously described to trigger the reelection procedure (step 1 & 2). In this embodiment, the gNB 10 determines the preferred SS block based on measurements of uplink signal from the wireless device, and directly and explicitly indicates to the wireless device 20 which new SS block it should use as SS-BPL instead of the current SS block. This indication can be performed using Layer 1 signaling, such as PDCCH or PDSCH signaling, or using higher layer signaling, such as RRC signaling. In the embodiment shown in FIG. 4 the, gNB 10 sends an SS block index to the wireless device 20 in the trigger signal. The gNB 10 updates the SS-BPL to use the new preferred SS block (step 4). Responsive to the trigger signal, wireless device 20 measures the indicated SS block to update the SS-BPL (steps 5 & 6) and reconfigure or tune its RX beam. That is, the wireless device assumes that the indicated SS block is spatially quasi co-located on the wireless device side with e.g. subsequent PDCCH transmissions. The end result is a realignment of the SS-BPL (step 7).

This mode of operation is useful when uplink signals from wireless device 20 to gNB 10 are used for measurements so that the gNB 10 knows the quality of each potential SS-BPL in which an order can directly be sent to the wireless device 20 to switch to another SS block as the SS-BPL. One example of an UL signal could be a sounding reference signal (SRS). By trying a set of receive beams that match those used to transmit the SS blocks, the gNB 10 could determine which potential SS-BPL is preferred based on, e.g., signal strength.

In contrast to conventional beam failure procedures, which are wireless device 20 initiated, the reselection procedure according to one aspect of the present disclosure is initiated by the network before beam link failure occurs. This ensures continuous availability and quality of the SS-BPL. Note that network controlled and wireless device initiated beam reselection functions are not mutually exclusive; they may be used together. In other words, the described logic for the selection of the new BPL in the wireless device 20 and gNB 10 can be applied in addition to the beam link failure recovery procedure, where the latter is a "safety net" in case of sudden beam link failures that may not be detectable in enough time by the gNB 10 to take pre-emptive action.

The procedures in the embodiments of FIG. 3 and FIG. 4 are triggered by the network, for example, by the gNB 10 transmitting a PDCCH order in the PDCCH common search space. The PDCCH order informs the wireless device 20 to begin the reselection process as described above. The gNB 10 can use a variety of methods to detect that the SS-BPL is becoming misaligned, e.g., based on reception of UL signals that can be assumed as spatially quasi co-located with the SS-block.

The procedures in the embodiments of FIG. 3 and FIG. 4 start with the gNB 10 detecting that the SS-BPL starts to degrade below a certain threshold. The SS-BPL can be measured, for example, based on UL signals that are assumed as spatially quasi co-located with the SS-block. For example, this could be PUCCH (and its associated DMRS) (short PUCCH or long PUCCH respectively). The gNB 10 can use the reference signal to estimate a quality metric on the SS-BPL, e.g., SINR, and track this over time to detect if the quality starts to drop below the threshold. A short PUCCH refers to an UL control channel transmitted in a slot (formed by 7 or 14 symbols in time domain and a multiple of 12 carriers in frequency domain) at the end of the slot and carrying a small payload of uplink control information (UCI). A long PUCCH relates to an uplink control channel transmitted over multiple OFDM symbols in the slot and carrying a larger UCI payload.

Before the link becomes seriously degraded, the gNB 10 explicitly signals the wireless device 20 to begin the reselection procedure. The reselection indication can be, for example, through a PDCCH order in a PDCCH transmitted in the PDCCH common search space. This is illustrated in the right-hand side of FIG. 1, and in FIGS. 3 and 4.

For example, in the embodiment of FIG. 3, when the wireless device 20 receives the PDCCH order, it performs a process similar to the PRACH transmission in the initial access procedure described above. Specifically, the wireless device 20 selects a preferred SS block beam based, e.g., on measured signal strength, or if the wireless device 20 already has these measurements (like for Alt1 of embodiment of FIG. 3), it selects a preferred SS block from available measurements. Quite likely this beam is different than the previous one since the measured link quality was starting to degrade. The wireless device 20 transmits a "reselection signal", e.g., a PRACH like-signal that is uniquely associated with the Radio Network Temporary Identifier (RNTI) indicated by the network. The wireless device 20 uses the same beam to transmit the reselection signal as it used to receive the preferred SS block. The gNB 10 can then use the same beam to receive the reselection signal as it used to transmit the SS block detected by the wireless device 20. When the network detects the reselection signal from the wireless device 20, it knows which wireless device 20 transmitted it, and thus it is able to keep track of the updated (re-aligned) SS-BPL for that wireless device 20. In this way, the SS-BPL is always usable at least for transmission of common or group common PDCCH. Hence the wireless device 20 is always reachable even as it moves/rotates. This availability over the common space PDCCH ensures robust system performance and improves latency compared to relying solely on a beam recovery procedure that is only executed once the beam pair link fails.

Figure 5:
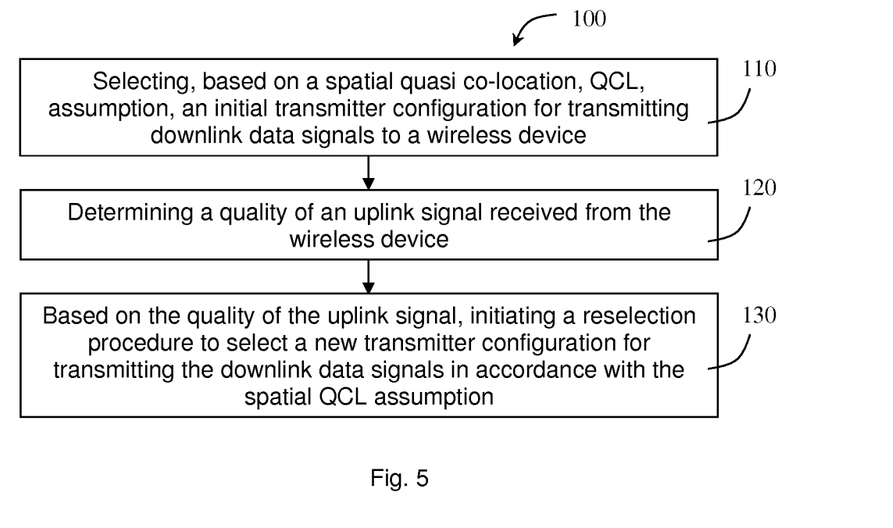
FIG. 5 illustrates an exemplary method implemented by a network node for selecting a new transmitter configuration.

FIG. 5 illustrates an exemplary method 100 implemented by a gNB 10 or other network node in a wireless communication network. The gNB 10 selects, based on a spatial quasi co-location (QCL) assumption, an initial transmitter configuration for transmitting downlink data signals to the wireless device 20 (block 110). Thereafter, the network node 10 determines a quality of an uplink signal received from the wireless device 20 (block 120). Based on the quality of the uplink signal, the gNB 10 initiates a reselection procedure to select a new transmitter configuration for transmitting the downlink data signals in accordance with the spatial QCL assumption (block 130).

In one embodiment, the gNB 10 selects the initial transmitter configuration by sending two or more downlink synchronization signals to the wireless device in different spatial directions, receiving a random access signal from the wireless device on a random access channel, said random access signal indicating a preferred synchronization signal, and selecting the initial transmitter configuration based on the preferred downlink synchronization signal.

In some embodiments, the method 100 further comprises receiving, responsive to the trigger signal, a reselection signal from the wireless device, said reselection signal indicating a new preferred downlink synchronization signal; and selecting the new transmitter configuration for transmitting based on the new preferred downlink synchronization signal.

In some embodiments, the method 100 further comprises measuring uplink reference signals transmitted by the wireless device on an uplink channel; and selecting a new transmitter configuration based on the measurements of the uplink reference signals.

Figure 6:
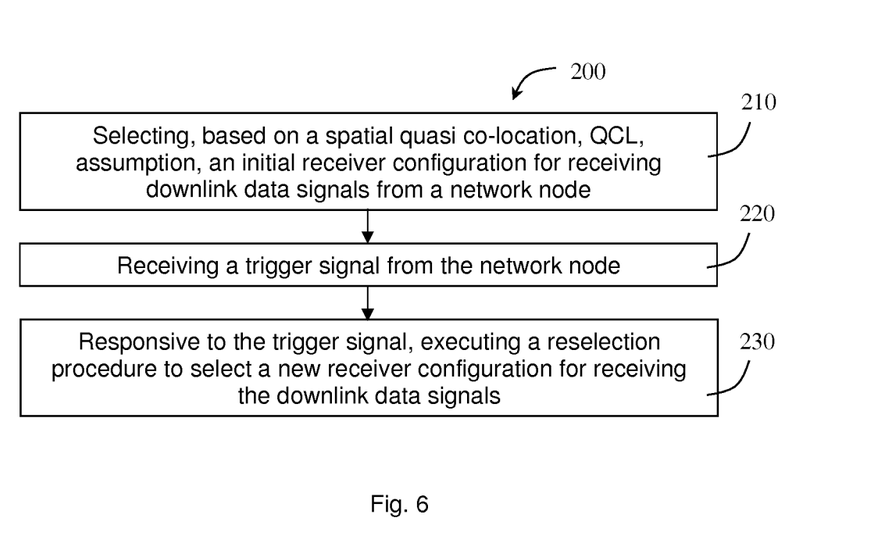
FIG. 6 illustrates an exemplary method implemented by a wireless device for selecting a new receiver configuration.

FIG. 6 illustrates an exemplary method 200 implemented by a wireless device 20 in a wireless communication network. The wireless device 20 selects, based on a spatial quasi co-location (QCL) assumption, an initial receiver configuration for receiving downlink data signals from a network node (block 210). After selecting the initial receiver configuration, the wireless device 20 receives a trigger signal from the network node (block 220). Responsive to the trigger signal, the wireless device 20 executes a reselection procedure to select a new receiver configuration for receiving the downlink data signals.

In one embodiment, the wireless device 20 selects the initial receiver configuration by receiving two or more downlink synchronization signals transmitted by the network node in different spatial directions, selecting a preferred one of said downlink synchronization signals, selecting the initial receiver configuration based on the preferred downlink synchronization signal; and sending a random access signal to the network node on a random access channel, said random access signal indicating the preferred synchronization signal.

In some embodiments, the method 200 further comprises, responsive to the trigger signal, detecting a new preferred one of two or downlink synchronization signal transmitted by the network node in different spatial directions; and selecting the new receiver configuration for receiving the downlink data signals from the network node based on the spatial QCL assumption that the transmissions of the downlink data signals are quasi co-located with the transmission of the new preferred downlink synchronization signal.

In some embodiments, the method 200 further comprises, responsive to the trigger signal, selecting, receiving an indication of a new preferred synchronization signal from m the network node; detecting the preferred downlink synchronization signal indicated by the network node; and selecting the new receiver configuration for receiving the downlink data signals from the network node based on the spatial QCL assumption that the transmissions of the downlink data signals are quasi co-located with the transmission of the new preferred downlink synchronization signal.

Figure 7:
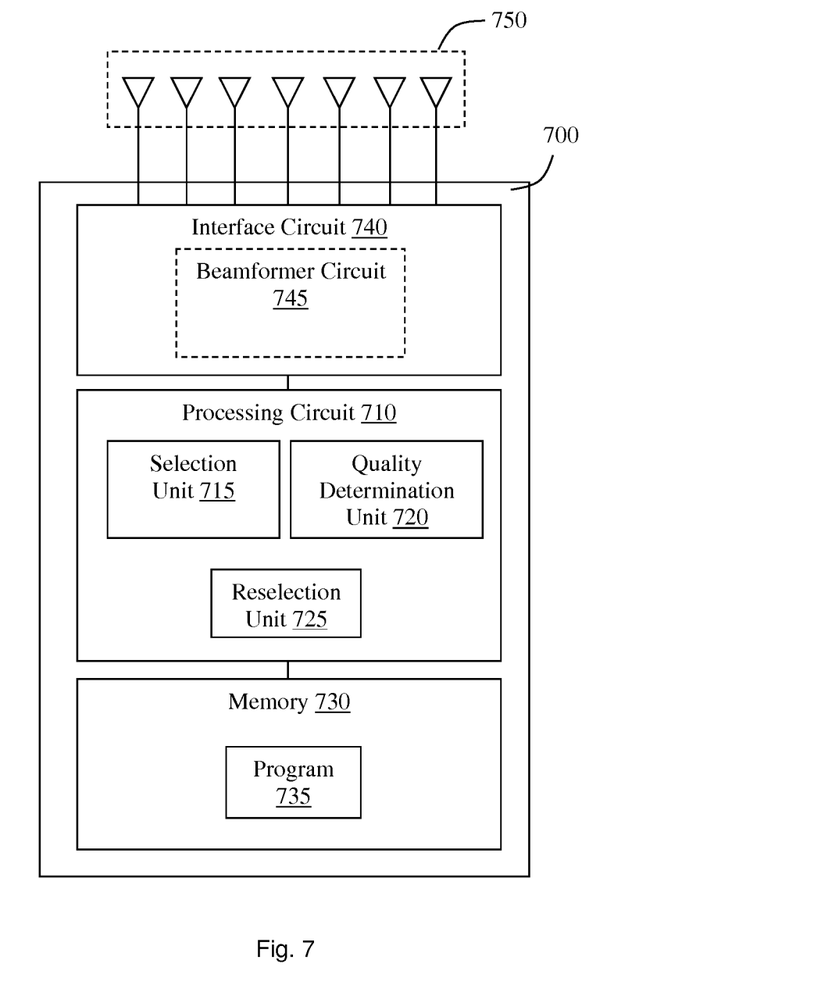
FIG. 7 illustrates an exemplary network node configured to select a new transmitter configuration responsive to detection of beam pair misalignment.

FIG. 7 illustrates the main functional components of a network node 700 configured to implement the re-election procedure herein described. The network node 700 comprises a processing circuit 710, a memory 730, and an interface circuit 740. The interface circuit 740 includes a network interface circuit 745 to enable communication with other network nodes in the core network and with base stations 10 in the radio access network (RAN).

The processing circuit 710 controls the operation of the network node 700. The processing circuit 710 may comprise one or more microprocessors, hardware, firmware, or a combination thereof. The processing circuit 710 may include a selection unit 715 to select the initial transmitter configuration, a quality determination unit 720 to measure a quality of uplink signals, and a reselection unit 725 to reselect the transmitter configuration during the reelection procedure as herein described. The processing circuit 710 is configured to perform the methods and procedures as herein described, including the methods shown in FIG. 2-4.

Memory 730 comprises both volatile and non-volatile memory for storing computer program code and data needed by the processing circuit 710 for operation. Memory 730 may comprise any tangible, non-transitory computer-readable storage medium for storing data including electronic, magnetic, optical, electromagnetic, or semiconductor data storage. Memory 730 stores a computer program 735 comprising executable instructions that configure the processing circuit 710 to implement the methods and procedures described herein. In general, computer program instructions and configuration information are stored in a non-volatile memory, such as a read only memory (ROM), erasable programmable read only memory (EPROM), or flash memory. Temporary data generated during operation may be stored in a volatile memory, such as a random access memory (RAM). In some embodiments, a computer program 735 for configuring the processing circuit 710 as herein described may be stored in a removable memory, such as a portable compact disc, portable digital video disc, or other removable media. The computer program 735 may also be embodied in a carrier such as an electronic signal, optical signal, radio signal, or computer readable storage medium.

Figure 8:
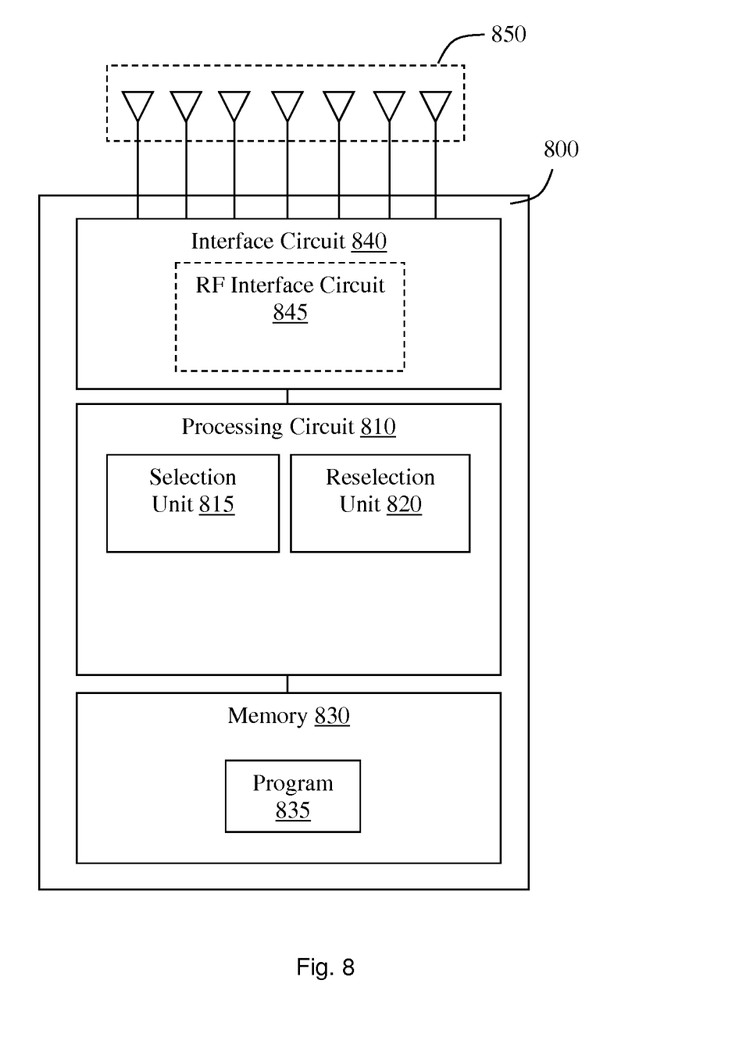
FIG. 8 illustrates an exemplary wireless device configured to select a new receiver configuration responsive to a trigger signal from a serving network node.

FIG. 8 illustrates the main functional components of wireless device 800 configured to implement the configuration methods as herein described. The wireless device 800 comprises a processing circuit 810, a memory 830, and an interface circuit 840. The interface circuit 840 includes a radio frequency (RF) interface circuit 845 coupled to one or more antennas 850. The RF interface circuit 845 comprises the radio frequency (RF) components needed for communicating with base stations 10 over a wireless communication channel. Typically, the RF components include a transmitter and receiver adapted for communications according to the 3G, 4G, or 5G standards, or other Radio Access Technology (RAT).

The processing circuit 810 processes the signals transmitted to or received by the wireless device 800. Such processing includes coding and modulation of transmitted signals, and the demodulation and decoding of received signals. The processing circuit 810 may comprise one or more microprocessors, hardware, firmware, or a combination thereof. In one embodiment, the processing circuit 810 may include a selection unit 815 to select the initial transmitter configuration, and a reselection unit 820 to reselect the transmitter configuration responsive to a trigger signal as herein described. The processing circuit 810 is configured to perform the methods and procedures as herein described. Memory 830 comprises both volatile and non-volatile memory for storing computer program code and data needed by the processing circuit 810 for operation. Memory 830 may comprise any tangible, non-transitory computer-readable storage medium for storing data including electronic, magnetic, optical, electromagnetic, or semiconductor data storage. Memory 830 stores a computer program 835 comprising executable instructions that configure the processing circuit 810 to implement the methods and procedures described herein including methods according to FIGS. 2, 3 and 5. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 835 for configuring the processing circuit 810 as herein described may be stored in a removable memory, such as a portable compact disc, portable digital video disc, or other removable media. The computer program 835 may also be embodied in a carrier such as an electronic signal, optical signal, radio signal, or computer readable storage medium.

The invention claimed is:

1. A method implemented by a network node in a wireless communication network, the method comprising the network node:
   selecting, based on a spatial quasi co-location (QCL) assumption, an initial transmitter configuration for transmitting downlink data signals to a wireless device by:
      sending two or more downlink synchronization signals to the wireless device in different spatial directions;
      receiving a random access signal from the wireless device on a random access channel, the random access signal indicating a preferred downlink synchronization signal; and
      selecting the initial transmitter configuration based on the preferred downlink synchronization signal;
   determining a quality of an uplink signal received from the wireless device; and
   based on the quality of the uplink signal, initiating a reselection procedure to select a new transmitter configuration for transmitting the downlink data signals in accordance with further spatial QCL assumption.

2. The method of claim 1, wherein the selecting the initial transmitter configuration based on the preferred downlink synchronization signal comprises selecting the initial transmitter configuration for transmitting the downlink data signals so that the transmission of the downlink data signals is quasi co-located with the transmission of the preferred synchronization signal.

3. The method of claim 1:
   wherein the initiating the reselection procedure comprises sending a trigger signal to the wireless device;
   further comprising:
      receiving, responsive to the trigger signal, a reselection signal from the wireless device, the reselection signal indicating a new preferred downlink synchronization signal; and
      selecting the new transmitter configuration for transmitting based on the new preferred downlink synchronization signal.

4. The method of claim 3, wherein the reselection signal comprises a random access signal transmitted by the wireless device on a random access channel.

5. The method of claim 3, wherein the selecting the new transmitter configuration based on the new preferred downlink synchronization signal comprises selecting the initial transmitter configuration for transmitting the downlink data signal so that the transmissions of the downlink data signals are quasi co-located with the transmission of the new preferred synchronization signal.

6. The method of claim 1, further comprising:
   measuring uplink reference signals transmitted by the wireless device on an uplink channel; and
   selecting a new transmitter configuration based on the measurements of the uplink reference signals.

7. A network node in a wireless communication network comprising:
   interface circuitry configured to transmit signals to, and receive signals from, a wireless device served by the network node; and
   processing circuitry configured to:
   select, based on a spatial quasi co-location (QCL) assumption, an initial transmitter configuration for transmitting downlink data signals to the wireless device by:
      sending two or more downlink synchronization signals to the wireless device in different spatial directions;
      receiving a random access signal from the wireless device on a random access channel, the random access signal indicating a preferred downlink synchronization signal; and
      selecting the initial transmitter configuration based on the preferred downlink synchronization signal;
   determine a quality of an uplink signal received from the wireless device; and
   based on the quality of the uplink signal, initiate a reselection procedure to select a new transmitter configuration for transmitting the downlink data signals in accordance with a further spatial QCL assumption.

8. A non-transitory computer readable recording medium storing a computer program product for controlling a network node in a wireless communication network, the computer program product comprising software instructions which, when run on processing circuitry of the network node, causes the network node to:
   select, based on a spatial quasi co-location (QCL) assumption, an initial transmitter configuration for transmitting downlink data signals to a wireless device by:
      sending two or more downlink synchronization signals to the wireless device in different spatial directions;
      receiving a random access signal from the wireless device on a random access channel, the random access signal indicating a preferred downlink synchronization signal; and
      selecting the initial transmitter configuration based on the preferred downlink synchronization signal;
   determine a quality of an uplink signal received from the wireless device; and
   based on the quality of the uplink signal, initiate a reselection procedure to select a new transmitter configuration for transmitting the downlink data signals in accordance with a further spatial QCL assumption.

9. A method implemented by a wireless device in a wireless communication network, the method comprising the wireless device:
   selecting, based on a spatial quasi co-location (QCL) assumption, an initial receiver configuration for receiving downlink data signals from a network node by:
      receiving, at the wireless device, two or more downlink synchronization signals transmitted by the network node in different spatial directions;
      selecting a preferred one of the downlink synchronization signals;
      selecting the initial receiver configuration based on the preferred downlink synchronization signal; and sending a random access signal to the network node on a random access channel, the random access signal indicating the preferred synchronization signal;

receiving a trigger signal from the network node; and responsive to the trigger signal, executing a reselection procedure to select a new receiver configuration for receiving the downlink data signals based on a further spatial QCL assumption.

10. The method of claim 9, wherein the selecting the initial receiver configuration based on the preferred downlink synchronization signal comprises selecting the initial receiver configuration for receiving the downlink data signals based on the QCL assumption that the transmissions of the downlink data signals are quasi co-located with the transmission of the preferred synchronization signal.

11. The method of claim 9, further comprising, responsive to the trigger signal:

detecting a new preferred one of two downlink synchronization signals transmitted by the network node in different spatial directions; and selecting a new receiver configuration for receiving the downlink data signals from the network node based on the spatial QCL assumption that the transmissions of the downlink data signals are quasi co-located with the transmission of the new preferred downlink synchronization signal.

12. The method of claim 9, further comprising, responsive to the trigger signal:

receiving an indication of a new preferred downlink synchronization signal from the network node;

detecting the preferred downlink synchronization signal indicated by the network node; and selecting the new receiver configuration for receiving the downlink data signals from the network node based on the spatial QCL assumption that the transmissions of the downlink data signals are quasi co-located with the transmission of the new preferred downlink synchronization signal.

13. The method of claim 9, wherein the selecting the initial receiver configuration and selecting the new receiver configuration comprise selecting beamforming weights used to generate a receive beam for receiving the downlink data signals.

14. A wireless device in a wireless communication network comprising:

interface circuitry for transmitting signals to and receiving signals from a network node; and processing circuitry configured such that the wireless device is operative to:

select, based on a spatial quasi co-location (QCL) assumption, an initial receiver configuration for receiving downlink data signals from a network node by:

receiving, at the wireless device, two or more downlink synchronization signals transmitted by the network node in different spatial directions;

selecting a preferred one of the downlink synchronization signals;

selecting the initial receiver configuration based on the preferred downlink synchronization signal; and sending a random access signal to the network node on a random access channel, the random access signal indicating the preferred synchronization signal;

receive a trigger signal from the network node; and responsive to the trigger signal, execute a reselection procedure to select a new receiver configuration for receiving the downlink data signals based on a further spatial QCL assumption.

15. A non-transitory computer readable recording medium storing a computer program product for controlling a wireless device in a wireless communication network, the computer program product comprising software instructions which, when run on processing circuitry of the wireless device, causes the wireless device to:

select, based on a spatial quasi co-location (QCL) assumption, an initial receiver configuration for receiving downlink data signals from a network node by:

receiving, at the wireless device, two or more downlink synchronization signals transmitted by the network node in different spatial directions;

selecting a preferred one of the downlink synchronization signals;

selecting the initial receiver configuration based on the preferred downlink synchronization signal; and sending a random access signal to the network node on a random access channel, the random access signal indicating the preferred synchronization signal;

receive a trigger signal from the network node; and responsive to the trigger signal, execute a reselection procedure to select a new receiver configuration for receiving the downlink data signals based on a further spatial QCL assumption.

* * * * *